US010018142B1

(12) United States Patent
Ferrara et al.

(10) Patent No.: US 10,018,142 B1
(45) Date of Patent: Jul. 10, 2018

(54) AUXILIARY FUEL INJECTOR TIMING DRIVER

(71) Applicant: GM GLOBAL TECHNOLOGY OPERATIONS LLC, Detroit, MI (US)

(72) Inventors: Umberto Ferrara, Turin (IT); Luca Chiapusso, Turin (IT); Raffaele Esposito, Siano (IT); Marco Tiberio, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/429,245

(22) Filed: Feb. 10, 2017

(51) Int. Cl.
| B60T 7/12 | (2006.01) |
| F02D 41/38 | (2006.01) |
| F02B 7/04 | (2006.01) |
| F02M 57/00 | (2006.01) |
| F02D 41/22 | (2006.01) |
| F02D 41/40 | (2006.01) |

(52) U.S. Cl.
CPC .............. F02D 41/38 (2013.01); F02B 7/04 (2013.01); F02D 41/222 (2013.01); F02D 41/402 (2013.01); F02M 57/00 (2013.01); F02D 2041/389 (2013.01); F02D 2200/021 (2013.01)

(58) Field of Classification Search
CPC .............. F02D 1/16; F02D 2001/0085; F02D 2200/0618; F02D 2700/10; F02D 41/34; F02D 41/345; F02D 41/401; F02D 41/266; F02D 19/0623; F02D 2041/1418
USPC ........ 701/101, 103–105, 107, 110, 111, 113, 701/114
See application file for complete search history.

(56) References Cited

U.S. PATENT DOCUMENTS

| 2003/0061803 | A1* | 4/2003 | Iihoshi | ...................... F02B 1/12 60/285 |
| 2006/0272608 | A1* | 12/2006 | Hara | ................... F01L 13/0015 123/182.1 |
| 2007/0227492 | A1* | 10/2007 | Cheiky | ................... F02B 31/00 123/304 |
| 2008/0147300 | A1* | 6/2008 | Kakuya | ............... F02D 13/0265 701/103 |
| 2008/0243358 | A1* | 10/2008 | Kojima | ................. F02D 35/025 701/102 |

* cited by examiner

Primary Examiner — John Kwon
(74) Attorney, Agent, or Firm — Quinn IP Law

(57) ABSTRACT

A method is provided for operating a compression-ignition engine having a combustion chamber. The method includes establishing, via an injection driver, electronic communication with a primary clock configured to generate a primary time signal. The method also includes commanding an injector to introduce into the combustion chamber injections of fuel having respective pulse widths timed using the primary time signal to generate combustion within the combustion chamber. The method additionally includes detecting a loss of the primary time signal and subsequently establishing an electronic communication between the injection driver and an auxiliary clock configured to generate an auxiliary time signal. Furthermore, the method includes commanding the injector to introduce into the combustion chamber a number of injections of fuel having respective pulse widths timed using the auxiliary time signal and thereby continuing combustion within the combustion chamber. A vehicle employing the injection driver for executing the method is also provided.

20 Claims, 2 Drawing Sheets

U.S. 10,018,142 B1

AUXILIARY FUEL INJECTOR TIMING DRIVER

INTRODUCTION

The present disclosure is drawn to an auxiliary timing driver for fuel injector(s) in a compression-ignition engine.

Modern internal combustion engines typically employ electronic fuel control to regulate engine output torque. In a spark-ignition or gasoline engine, an amount of air supplied to the engine is controlled via an electronic throttle control (ETC) to establish the amount of injected fuel, and thereby regulate the engine's output torque. On the other hand, in compression-ignition or diesel internal combustion engines, the engine's output torque control is typically accomplished directly via the amount of injected fuel. Additionally, the injection of fuel typically needs to be timed with precision to appropriately regulate the torque output, efficiency, and exhaust emissions of the engine.

SUMMARY

A method is provided for operating a compression-ignition engine having a combustion chamber. The method includes using an injection driver to establish electronic communication with a primary clock configured to generate a primary time signal. The method also includes commanding an injector, via the injection driver, to introduce into the combustion chamber injections of fuel having respective pulse widths timed using the primary time signal to thereby generate combustion within the combustion chamber. The method additionally includes using the injection driver to detect a loss of the primary time signal and establish an electronic communication with an auxiliary clock configured to generate an auxiliary time signal following detecting the loss of the primary time signal. Furthermore, the method includes commanding the injector via the injection driver to introduce into the combustion chamber a number of injections of fuel having respective pulse widths timed using the auxiliary time signal and thereby continuing combustion within the combustion chamber.

The primary clock may be arranged external to the injection driver.

The auxiliary clock may be arranged internal to the injection driver.

The primary time signal may be characterized by a primary signal frequency and the auxiliary time signal may be characterized by an auxiliary signal frequency. The primary signal frequency may be greater than the auxiliary signal frequency, such that timing of the pulse width of the at least one injection of fuel via the auxiliary signal is less accurate than timing of the pulse widths of injections of fuel via the primary signal.

The engine may be cooled via a coolant. In such a case, the method may also include detecting a temperature of the coolant via a sensor in communication with a controller configured to regulate operation of the engine and in operative communication with the injection driver. Additionally, the method may include selecting, via the controller, a maximum number of the injections of fuel having the pulse width timed by the auxiliary time signal in response to the detected temperature of the coolant.

The controller may be programmed with a lookup table correlating the maximum number the injections of fuel having the pulse width timed by the auxiliary time signal to the detected temperature of the coolant. In such a case, the act of selecting the maximum number of the injections of fuel having the pulse width timed by the auxiliary time signal may be accomplished from a lookup table programmed into the controller.

Selecting the number of the injections of fuel having the pulse width timed using the auxiliary time signal may include selecting a maximum number of the injections of fuel.

The selected maximum number of the injections of fuel having the pulse width timed using the auxiliary time signal may be higher when the detected temperature of the coolant is below a predetermined value than the selected maximum number of the respective injections of fuel when the detected temperature of the coolant is above the predetermined value.

The method may additionally include setting, via the controller, a fault code or a sensory signal following the detection of the loss of the primary time signal.

The method may additionally include detecting, via the injection driver, a resumption of the primary time signal from the primary clock. Also, the method may include switching, via the injection driver, from the auxiliary time signal to the primary time signal to time pulse widths of subsequent injections of fuel introduced by the fuel injector into the combustion chamber.

The act of switching from the auxiliary time signal to the primary time signal may be accomplished following an elapse of a predetermined amount of time after the detected the resumption of the time signal from the primary clock.

A vehicle employing an injection driver programmed and operable with the above method is also disclosed.

The above features and advantages and other features and advantages of the present disclosure are readily apparent from the following detailed description of the best modes for carrying out the disclosure when taken in connection with the accompanying drawings.

DETAILED DESCRIPTION

Figure 1:
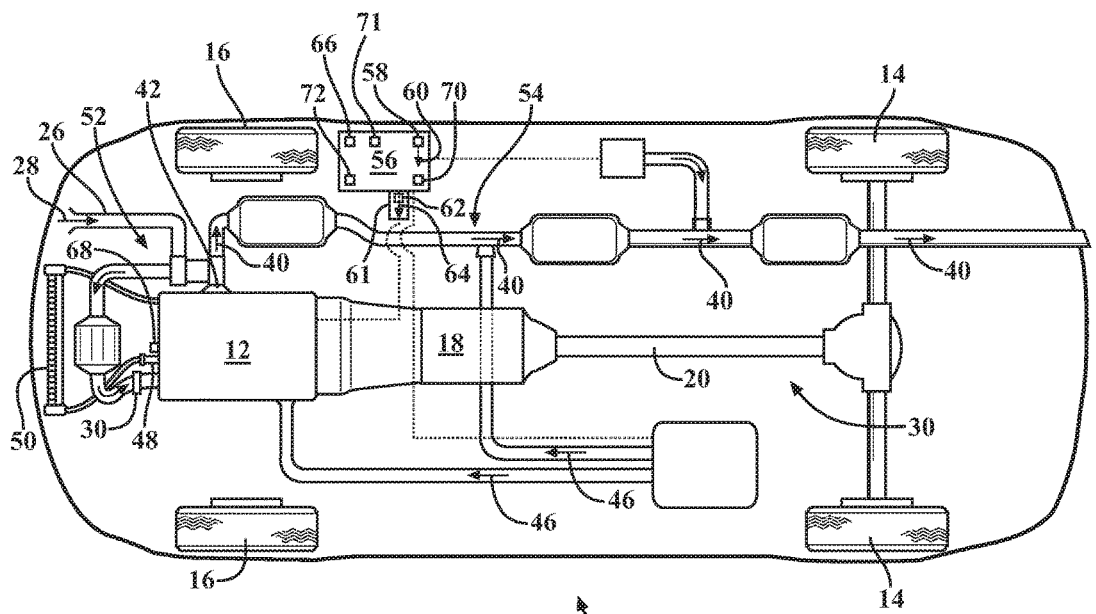
FIG. 1 is a schematic illustration of a vehicle including a compression-ignition internal combustion engine operable by an electronic controller.

Referring to the drawings, wherein like reference numbers refer to like components, FIG. 1 shows a schematic view of a vehicle 10. The vehicle 10 incorporates a powertrain that includes an internal combustion engine 12. The engine 12 is configured as a compression-ignition or diesel type. The engine 12 applies its torque to the driven wheels 14 and/or 16 through a transmission 18 and via a drive or a propeller shaft 20, as shown by an exemplary embodiment in FIG. 1.

Figure 2:
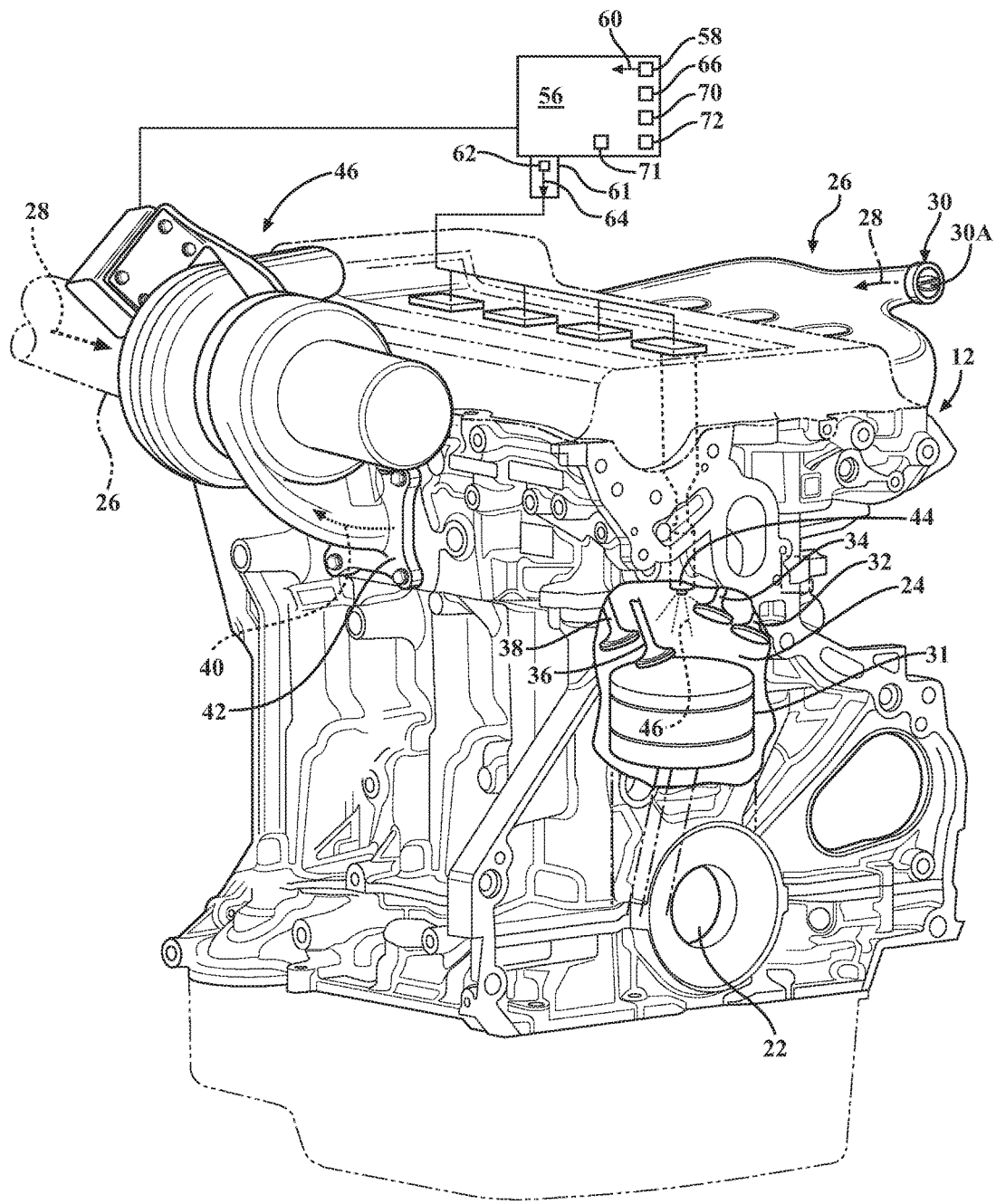
FIG. 2 is a schematic perspective close-up view of the engine shown in FIG. 1.

As shown in FIG. 2, the engine 12 includes a crankshaft 22 and cylinders defining combustion chambers 24 that are configured to burn a mixture of fuel and air therein. Although a single combustion chamber 24 is shown, the engine 12 may include as many such combustion chambers as required by the specific design of the engine. The engine 12 also includes an intake passage 26 that is in fluid communication with the combustion chambers 24. The intake passage 26 is configured to deliver a flow of intake air 28 from the atmosphere or ambient to the combustion chambers 24. As shown in FIG. 1, a throttle 30, such as having a moveable throttle blade 30A (shown in FIG. 2), is positioned at the intake passage 26 and configured to control supply of the flow of intake air 28 delivered to the combustion chambers 24 through the intake passage.

As additionally shown in FIG. 2, each combustion chamber 24 also includes a piston 31 and a connecting rod that is not shown, but the existence of which would be appreciated by those skilled in the art. Each piston 31 is configured to reciprocate under the force of combustion inside the respective combustion chamber 24, and thereby rotate the crankshaft 22 via the connecting rod and regulate volume of the combustion chamber. As additionally shown in FIG. 2, each combustion chamber 24 may be provided with a first intake valve 32, a second intake valve 34, a first exhaust valve 36, and a second exhaust valve 38. Each intake valve 32, 34 is configured to control a supply of air or of air and fuel into the respective combustion chamber 24 when the engine 12 is propelling the vehicle 10. Each exhaust valve 36, 38 is configured to control the removal of a post-combustion exhaust gas 40 from the respective combustion chamber 24 via an exhaust passage 42. Although two intake valves 32, 34 and two exhaust valves 36, 38 are described herein and depicted in the figures, nothing precludes the engine 12 from being equipped with fewer or greater number of intake and exhaust valves.

The engine 12 additionally includes fuel injectors 44. Fuel injectors 44 are provided for each combustion chamber 24 and are configured to supply a metered amount of fuel 46 for mixing with the flow of intake air 28 and combustion inside the respective combustion chamber 24. Although the diesel engine 12 is shown as having the previously discussed throttle blade 30A, the engine may be configured to operate without such a throttle blade. In such a diesel engine configuration, combustion inside the combustion chambers 24 is controlled via the amount of fuel introduced by the respective fuel injectors 44 into the particular combustion chambers, wherein the injected fuel becomes combined with the air drawn into the particular combustion chambers by the respective pistons 31.

Following a start of the engine 12, the combustion of the mixture of flow of intake air 28 and fuel 46 inside the combustion chambers 24 steadily increases the temperature of the exhaust gas 40 and the temperature of the entire engine during a transient warm-up stage of engine operation. As understood by those skilled in the art, a coolant 48, i.e., a specially formulated cooling fluid, is circulated throughout the engine and through a heat exchanger 50 to remove excess heat after the engine has reached full operating temperature. As will be appreciated by those skilled in the art, exhaust emissions, fuel efficiency, and power output of the engine 12 may each be affected by the operating temperature of the engine 12.

As shown in FIGS. 1 and 2, the engine 12 may additionally include a turbocharger 52 positioned at the intake passage 26 and configured to pressurize the flow of intake air 28 prior to the delivery of the intake airflow to the combustion chambers 24. Although the turbocharger 52 is shown, nothing precludes the engine 12 from being configured and operated without such a power augmentation device. The turbocharger 52 may be configured as a variable geometry turbocharger (VGT) that includes a variable position vane mechanism with a plurality of moveable vanes configured to adapt operation of the VGT to operating speed of the engine 12 and thus facilitate increased engine operating efficiency, as understood by those skilled in the art. The exhaust passage 42 is configured to channel the exhaust gas 40 from the combustion chambers 24 to the turbocharger 52 for pressurizing the flow of intake air 28 and subsequent channeling of the exhaust gas to an exhaust system 54. Accordingly, injection of the fuel 46 via the injectors 44 is coordinated with the operation of the turbocharger 52. As understood by those skilled in the art, the exhaust system 54 typically includes after-treatment devices configured to methodically remove largely carbonaceous particulate byproducts of engine combustion from the exhaust gas 40 and reduce emissions of such particulates into the atmosphere.

With continued reference to FIGS. 1 and 2, the vehicle 10 also includes a controller 56, such as an engine control unit (ECU), configured or programmed to regulate the operation of the engine 12 along with the operation of the turbocharger 52. The controller 56 includes a memory that is tangible and non-transitory. The memory may be a recordable medium that participates in providing computer-readable data or process instructions. Such a medium may take many forms, including but not limited to non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 56 may also include a flexible disk, hard disk, magnetic tape, other magnetic medium, a CD-ROM, DVD, other optical medium, etc. The controller 56 is equipped with a high-speed primary clock 58 configured to generate a primary time signal 60, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 56 or accessible thereby may be stored in the memory and automatically executed to provide the required functionality.

The controller 56 can include or be otherwise in electronic communication with an injection driver 61. According to the disclosure, the injection driver 61 may be an electronic or an electro-mechanical device specifically configured to regulate the injectors 44 and thereby control the injection of fuel 46. The injection driver 61 is in electronic communication with the primary clock 58, such that the primary clock functions as a timing device for operation of the fuel injectors 44. Specifically, under general operation of the engine 12, the injection driver 61 commands the injectors 44 to introduce into the combustion chambers 24 injections of fuel 46 having respective pulse widths timed using the primary time signal 60. As will be described below, however, under certain conditions during operation of the engine 12, the connection between the primary clock 58 and the injection driver 61 can be lost.

According to the disclosure, the injection driver 61 includes a low-speed clock 62 configured to generate an auxiliary time signal 64. In other words, the low-speed clock 62 is arranged internal to the injection driver 61, and may be used by the injection driver as an auxiliary clock. The low-speed clock 62 may be configured to time a pulse width of each injection of fuel 46, and may be used as a back-up device accessed by the injection driver 61 for timing operation of the fuel injectors 44 in the event the signal 60 from the primary clock 58 is lost. To address such an eventuality, in a remedial role, the controller 56 may be configured to detect a loss of the primary time signal 60. Additionally, the injection driver 61 is configured to establish an electronic communication with the auxiliary clock 62, i.e., switch from using the primary clock 58 to using the auxiliary clock 62, following and in response to the detection of the loss of the primary time signal 60. Furthermore, the injection driver 61 is configured to command the injector 46 to introduce into the combustion chamber 24 a number of injections of fuel 46, i.e., at least one such injection, having a respective pulse width timed using the auxiliary time signal 64. Such injection of the fuel 46 is intended to continue, i.e., either maintain or resume, combustion within the combustion chambers 24, and, therefore, operation of the engine 12.

Although, switching from the primary clock 58 to the auxiliary clock 62 may permit the injection driver 61 to continue supplying engine 12 with the fuel 46, the respective time signals 60 and 64 may not be entirely interchangeable. Specifically, the primary time signal 60 may be characterized by a primary signal frequency, while the auxiliary time signal 64 may be characterized by an auxiliary signal frequency, and the primary signal frequency may be greater than the auxiliary signal frequency. In such an embodiment, timing of the pulse width of the injections of fuel 46 via the auxiliary signal 64 may be less accurate than timing of the pulse widths of injections of fuel via the primary signal 60. The above-noted discrepancy may be the result of the primary clock 58 being specifically configured to provide its primary time signal 60 for precise control of sensitive engine operations, such as metered injections of fuel 46, while the auxiliary clock 62 may be a general-use timer. As a result of the above, operation of the engine 12 may be diminished in terms of performance, fuel economy, and exhaust emissions. To facilitate appropriate correction of the underlying condition, following the detection of the loss of the primary time signal 60, the controller 56 may be additionally configured to set a fault code 66 and/or a sensory signal on a vehicle instrument panel (not shown).

As shown in FIG. 1, the engine 12 may also include a sensor 68 configured to detect a temperature of the coolant 48 in communication with the controller 56. The controller 56 may be programmed to select a maximum number of the injections of fuel 46 having the pulse width timed by the auxiliary time signal 64 in response to the temperature of the coolant detected by the sensor 68. The controller 56 may also be programmed with a lookup table 70 correlating the maximum number of injections of the fuel 46 having the pulse width timed by the auxiliary time signal 64 to the detected temperature of the coolant 48. In such an embodiment, the controller 56 may be additionally configured to select the maximum number of injections of the fuel 46 having their pulse width timed by the auxiliary time signal 64 using the lookup table 70. The lookup table 70 may be compiled empirically during testing of the engine 12 on a test stand or as part of the vehicle 10.

The selected maximum number of the injections of fuel 46 having the pulse width timed using the auxiliary time signal 64 may be higher when the detected temperature of the coolant is below a predetermined value 71 than the selected maximum number of the respective injections of fuel when the detected temperature of the coolant is above the predetermined value 71. The predetermined value 71 may signify a temperature of the coolant 48 below which during start-up the engine may experience prolonged cranking prior to firing, and the engine is considered as being started from cold. Specifically, the selected maximum number of the injections of fuel 46 may be higher at lower coolant 48 temperatures, such as below the predetermined temperature value 71, to facilitate ready cold-start of the engine 12. Furthermore, the selected maximum number of the injections of fuel 46 may be progressively decreased as the engine 12 continues to warm up as evidenced by a rise in the temperature of the coolant 48.

The injection driver 61 may also be configured to detect a resumption of the primary time signal 60, if such an occurrence takes place. Furthermore, the injection driver 61 may be configured to switch from the auxiliary time signal 64 to the primary time signal 60 to time pulse widths of subsequent injections of fuel 46 introduced by the fuel injector 44 into the combustion chamber 24. Such switching back to the primary time signal 60 is intended to facilitate resumption of precise injection of fuel 46 and a return to full operation of the engine 12 in terms of performance, fuel economy, and exhaust emissions. The injection driver 61 may be programmed to switch from the auxiliary time signal 64 to the primary time signal 60 following an elapse of a predetermined amount of time 72 after the detected resumption of the time signal from the primary clock 58. The elapsed predetermined amount of time 72 may be detected by either the primary clock 58 or the auxiliary clock 62.

Figure 3:
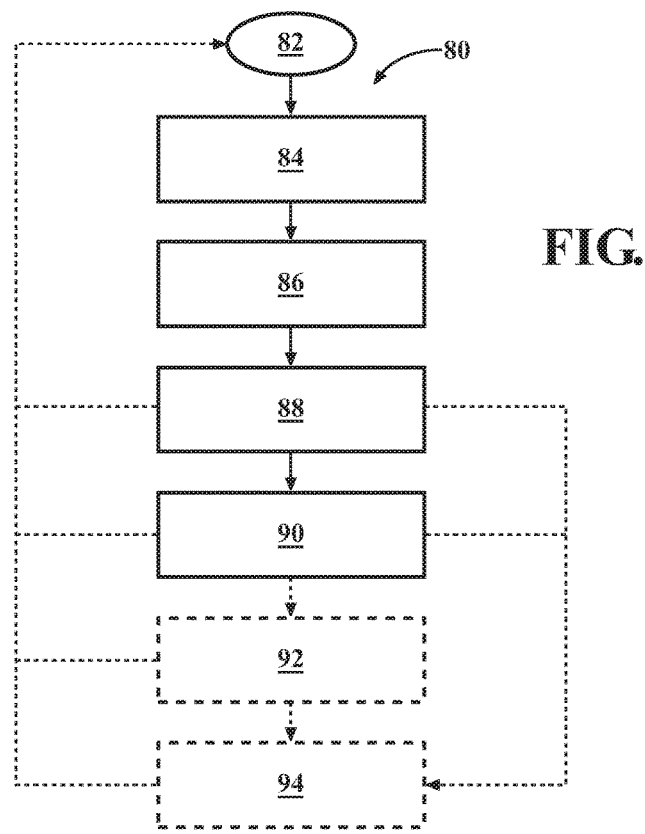
FIG. 3 is a flow diagram of a method of operating the compression-ignition engine via the electronic controller depicted in FIG. 1.

FIG. 3 depicts a method 80 of operating the compression-ignition engine 12 via the injection driver 61 in operative communication with the electronic controller 56, especially in the remedial role when the primary time signal 60 from the primary clock 58 is lost, as described above with respect to FIGS. 1 and 2. The method 80 commences in frame 82 with the injection driver 61 establishing an electronic communication with the primary clock 58. The method 80 then proceeds from frame 82 to frame 84, where the method includes the injection driver 61 commanding the injector 44 to introduce into the combustion chamber 24 injections of fuel 46 having respective pulse widths timed using the primary time signal 60 to thereby generate combustion within the combustion chambers 24. Accordingly, in frame 84 the injection driver 61 employs the primary time signal 60 to supply the fuel to the engine 12 and thereby enable the engine to power the vehicle 10.

Following frame 84, in frame 86 the method includes detecting, via the injection driver 61, a loss of the primary time signal 60. After frame 86 the method advances to frame 88. In frame 88, following the detecting the loss of the primary time signal 60, the method includes establishing, via the injection driver 61, electronic communication with the auxiliary clock 62 and switching from the primary clock to the auxiliary clock for receiving the auxiliary time signal 64. The method then proceeds from frame 88 to frame 90, where the method includes the injection driver 61 commanding the injector 44 to introduce into the combustion chamber injections of fuel 46 having respective pulse widths timed using the auxiliary time signal 64. As described above with respect to FIGS. 1 and 2, injecting fuel 46 having pulse widths timed using the auxiliary time signal 64 facilitates continued combustion within the combustion chamber and the resultant operation of the engine 12 in the event of the loss of the primary time signal 60.

According to the method, in frame 90 the method may include detecting, via the sensor 68, a temperature of the coolant 48. In frame 90 the method may also include selecting, via the controller 56, a maximum number of the injections of fuel 46 having the pulse width timed by the auxiliary time signal 64 in response to the detected temperature of the coolant 48. As discussed with respect to FIGS. 1 and 2, selection of the maximum number of the injections of fuel 46 having the pulse width timed by the auxiliary time signal 64 may be accomplished from the lookup table 70 correlating the number of the injections of fuel having their pulse widths timed by the auxiliary time signal 64 to the detected temperature of the coolant 48.

As additionally discussed with respect to FIGS. 1 and 2, the maximum number selected for the injections of fuel 46 timed using the auxiliary time signal 64 may be higher when the detected temperature of the coolant is below the predetermined value 71 than the maximum number of the respective injections of fuel selected when the detected temperature of the coolant is above the predetermined value 71. According to the method, following frame 90 the method may advance to frame 92 for setting, via the controller 56, the fault code 66 following the detection of the loss of the primary time signal 60.

After either of the frames 88-92, the method may advance to frame 94 for detecting resumption of the primary time signal 60, via the injection driver 61, and switching from the auxiliary time signal 64 to the primary time signal. Accordingly, the method may include resumption of timing pulse widths of injections of fuel 46 introduced by the fuel injectors 44 into the respective combustion chambers 24 upon and subsequent to the detection of the resumption of the primary time signal 60. Furthermore, such switching from the auxiliary time signal 64 to the primary time signal 60 may be accomplished following the predetermined amount of time 72 having elapsed after the resumption of the primary time signal 60 from the primary clock 58. Following either of the frames 88-94, the method may loop back to frame 82 for continued operation of the engine 12 and monitoring of the primary time signal 60 from the primary clock 58 via the injection driver 61.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of operating a compression-ignition engine having a combustion chamber, the method comprising:
    establishing, via an injection driver, an electronic communication with a primary clock configured to generate a primary time signal;
    commanding an injector, via the injection driver, to introduce into the combustion chamber injections of fuel having respective pulse widths timed using the primary time signal to thereby generate combustion within the combustion chamber;
    detecting, via the injection driver, a loss of the primary time signal;
    establishing, via the injection driver, an electronic communication with an auxiliary clock configured to generate an auxiliary time signal following detecting the loss of the primary time signal; and
    commanding the injector, via the injection driver, to introduce into the combustion chamber a number of injections of fuel having respective pulse widths timed using the auxiliary time signal and thereby continuing combustion within the combustion chamber.

2. The method of claim 1, wherein the primary clock is arranged external to the injection driver.

3. The method of claim 1, wherein the auxiliary clock is arranged internal to the injection driver.

4. The method of claim 1, wherein the primary time signal is characterized by a primary signal frequency and the auxiliary time signal is characterized by an auxiliary signal frequency, wherein the primary signal frequency is greater than the auxiliary signal frequency, such that timing of the pulse width of the number of injections of fuel using the auxiliary signal is less accurate than timing of the pulse widths of injections of fuel using the primary signal.

5. The method of claim 4, wherein the engine is cooled via a coolant, the method further comprising:
    detecting a temperature of the coolant via a sensor in communication with a controller configured to regulate operation of the engine and in operative communication with the injection driver; and
    selecting, via the controller, a maximum number of the injections of fuel having the pulse width timed using the auxiliary time signal in response to the detected temperature of the coolant.

6. The method of claim 5, wherein selecting the maximum number of the injections of fuel having the pulse width timed using the auxiliary time signal is accomplished from a lookup table programmed into the controller, wherein the lookup table correlates the number of the injections of fuel having the pulse width timed using the auxiliary time signal to the detected temperature of the coolant.

7. The method of claim 5, wherein the selected maximum number of the injections of fuel having the pulse width timed using the auxiliary time signal is higher when the detected temperature of the coolant is below a predetermined value than the selected maximum number of the respective injections of fuel when the detected temperature of the coolant is above the predetermined value.

8. The method of claim 5, further comprising setting, via the controller, a fault code following detecting the loss of the primary time signal.

9. The method of claim 1, further comprising detecting, via the injection driver, a resumption of the primary time signal from the primary clock and switching, via the injection driver, from the auxiliary time signal to the primary time signal to time pulse widths of subsequent injections of fuel introduced by the fuel injector into the combustion chamber.

10. The method of claim 9, wherein switching from the auxiliary time signal to the primary time signal is accomplished following an elapse of a predetermined amount of time after detecting the resumption of the primary time signal from the primary clock.

11. A vehicle comprising:
    a compression-ignition engine having:
        a combustion chamber;
        a fuel injector configured to introduce injections of fuel into the combustion chamber and thereby generate combustion therein;
        a primary clock configured to generate a primary time signal; and
        an auxiliary clock configured to generate an auxiliary time signal; and
    an injection driver configured to:
        establish an electronic communication with the primary clock;

command the injector to introduce into the combustion chamber injections of fuel having respective pulse widths timed using the primary time signal;

detect a loss of the primary time signal;

establish an electronic communication with the auxiliary clock following the detection of the loss of the primary time signal; and command the injector to introduce into the combustion chamber at least one injection of fuel having a respective pulse width timed using the auxiliary time signal and thereby continue combustion within the combustion chamber.

12. The vehicle of claim 11, wherein the primary clock is arranged internal to the injection driver.

13. The vehicle of claim 11, wherein the auxiliary clock is arranged internal to the injection driver.

14. The vehicle of claim 11, wherein the primary time signal is characterized by a primary signal frequency and the auxiliary time signal is characterized by an auxiliary signal frequency, wherein the primary signal frequency is greater than the auxiliary signal frequency, such that timing of the pulse width of the at least one injection of fuel via the auxiliary signal is less accurate than timing of the pulse widths of the injections of fuel via the primary signal.

15. The vehicle of claim 14, wherein the engine is cooled via a coolant, the vehicle further comprising a sensor in communication with a controller configured to regulate operation of the engine and in operative communication with the injection driver, wherein:

the sensor is configured to detect a temperature of the coolant; and the controller is configured to select a maximum number of the injections of fuel having the pulse width timed by the auxiliary time signal in response to the detected temperature of the coolant.

16. The vehicle of claim 15, wherein the controller is programmed with a lookup table correlating the maximum number of the at least one injection of fuel having the pulse width timed by the auxiliary time signal to the detected temperature of the coolant, and wherein the controller is additionally configured to select the maximum number of the injections of fuel having the pulse width timed by the auxiliary time signal using the lookup table.

17. The vehicle of claim 15, wherein the selected maximum number of the injections of fuel having the pulse width timed using the auxiliary time signal is higher when the detected temperature of the coolant is below a predetermined value than the selected maximum number of the respective injections of fuel when the detected temperature of the coolant is above the predetermined value.

18. The vehicle of claim 15, wherein the controller is configured to set a fault code following the detection of the loss of the primary time signal.

19. The vehicle of claim 11, wherein the injection driver is additionally configured to detect a resumption of the primary time signal from the primary clock and switch from the auxiliary time signal to the primary time signal to time pulse widths of subsequent injections of fuel introduced by the fuel injector into the combustion chamber.

20. The vehicle of claim 19, wherein the injection driver is additionally configured to switch from the auxiliary time signal to the primary time signal following an elapse of a predetermined amount of time after the detected resumption of the primary time signal from the primary clock.

\* \* \* \* \*